United States Patent [19]
Shaw

[11] Patent Number: 6,129,028
[45] Date of Patent: Oct. 10, 2000

[54] ELECTRICALLY POWERED TRANSIT CAR

[76] Inventor: John B. Shaw, 1812 E. Marlette Ave., Phoenix, Ariz. 85016

[21] Appl. No.: 09/170,729

[22] Filed: Oct. 13, 1998

[51] Int. Cl.[7] ...................................................... B61C 3/00
[52] U.S. Cl. .......................... 105/72.2; 104/243; 104/245; 191/23 R; 191/22 R
[58] Field of Search .................................... 104/304, 243, 104/245, 247, 106, 139, 295; 105/72.2; 191/23 R, 22 R, 23 A, 33 R

[56] References Cited

U.S. PATENT DOCUMENTS

| | | | |
|---|---|---|---|
| 2,925,875 | 2/1960 | Bourdon | 104/247 |
| 3,077,165 | 2/1963 | Vittorelli | 104/243 |
| 3,812,788 | 5/1974 | Laurent | 104/130 |
| 3,812,789 | 5/1974 | Nelson | 104/245 |
| 4,090,452 | 5/1978 | Segar | 104/247 |
| 4,596,192 | 6/1986 | Forster | 104/1 R |
| 4,888,454 | 12/1989 | Scarpatetti | 191/30 |
| 5,823,114 | 10/1998 | Cioletti | 104/124 |
| 5,845,581 | 12/1998 | Svensson | 104/120 |

*Primary Examiner*—Mark T. Le
*Assistant Examiner*—Frantz Jules
*Attorney, Agent, or Firm*—Warren F. B. Lindsley; Frank J. McGue

[57] ABSTRACT

A mechanism for steering a beam guided vehicle having four steerable wheels linked to a centrally located steering trolley guided by an electrified T-shape beam mounted on a structural roadbed. A trolley flexibly propelled by the vehicle follows the guide beam to actuate the steering of the wheels. The trolley is quickly detachable by drop-pit access for rapid change-out to periodic off vehicle servicing. Two steering arm sensor posts engaging two sockets in the repositioned trolley guarantee interchangeability of standardized repaired units.

12 Claims, 3 Drawing Sheets

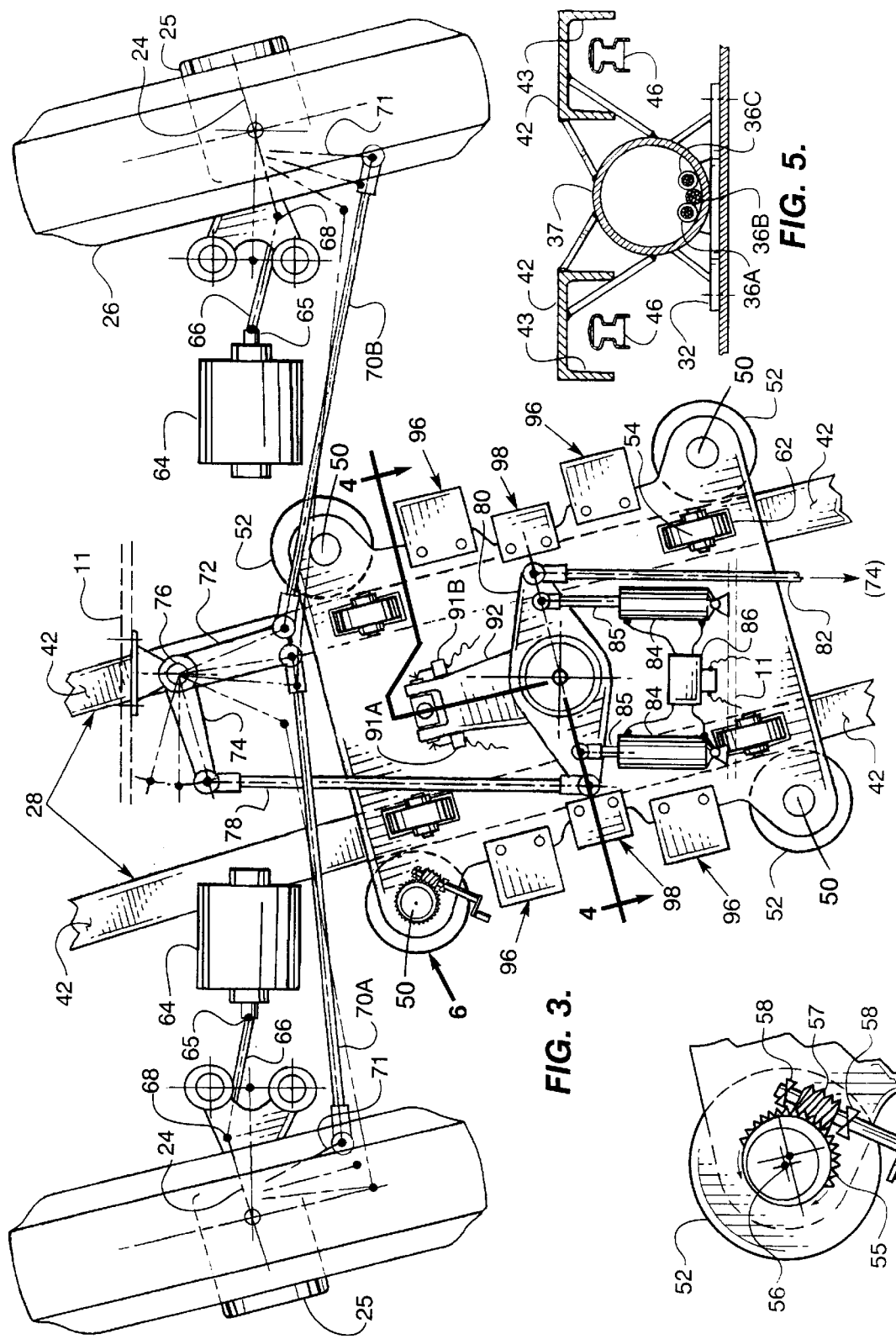

ELECTRICALLY POWERED TRANSIT CAR

TECHNICAL FIELD

This invention relates in general to electrically powered rubber-tired public transit cars, and, more particularly, to electrically powered and self-powered vehicles having light weight articulating guidance and steering mechanisms.

BACKGROUND OF THE INVENTION

Many electrically powered rail vehicles are in existence today, from Montreal's rubber-tired Metro to New York's subway to the overhead catenary or trolley system seen, for example, on the South Shore railroad serving Northwest Indiana and Chicago. In general, present day systems employ heavy steel, four wheeled bogies with large, slow speed integral motors as the driving mechanism thereof. Steering and guidance of such systems are provided by intense forces induced by the interaction of the steel flanged wheels against the steel rails or on existing rubber tired vehicles having four wheeled bogies, by guide flanges or side rollways. Use of such mechanisms requires a large investment in infrastructure to support these great forces safely.

Motive power is provided by, for example, an exposed electrified third rail as seen in London's subway system or overhead wires in trolley systems. Such systems have severe safety issues and/or are less than aesthetically pleasing.

None of the known prior art disclose the light weight transit vehicle set forth herein.

SUMMARY OF THE INVENTION

It is an object of this invention to provide a light weight rubber-tired public transit vehicle which employs a light weight but rugged articulating steering and precise guidance system.

It is a further object of this invention to provide a steering and guidance system for a light weight transit vehicle which reduces cost and operates safely and reliably with a reduced infrastructure investment.

It is a further object of this invention to provide a means for quick removal of the independent trolley assembly for periodic servicing of contact shoes and guide rollers by interchangeable rotation of identical assemblies, using the drop pit of the well known engine roundhouse.

It is a further object of this invention to provide means for each wheel to be individually driven by a single electric motor.

This invention is not for a typical rail use since rubber tires roll on flat surfaces of asphalt, concrete, steel and the like not rails.

Further objects and advantages of the invention will become apparent as the following description proceeds and features of novelty which characterize this invention will be demonstrated with particularity in the claims annexed to and forming a part of this specification.

BRIEF DESCRIPTION OF THE DRAWINGS

The present invention may be more readily described by reference to the accompanying drawings in which:

FIG. 3 is a top view of the articulated steering mechanism of the present invention;

FIG. 5 is a cross sectional view of an alternate guide beam construction; and

FIG. 6 is a top view of a means for precise alignment of roller contact with the guide rail.

DESCRIPTION OF THE PREFERRED EMBODIMENT

Figure 1A:
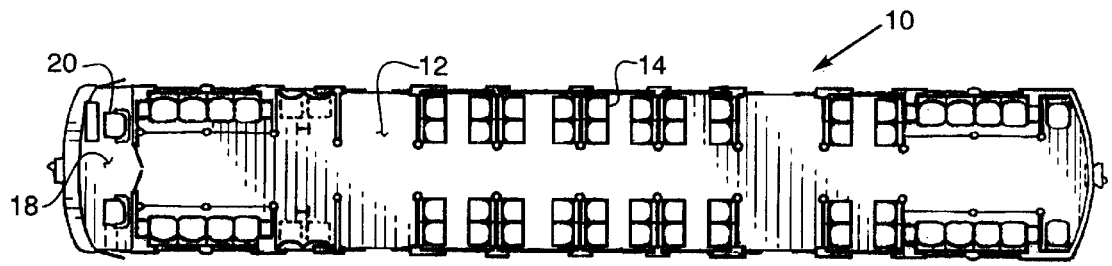
FIGS. 1A and 1B are side and top views of a typical light vehicle embodying the present invention.

As best seen in FIG. 1A, a proposed light transit car or vehicle 10 is illustrated. Vehicle 10 comprises a cabin 12 having a passenger area including a plurality of seats 14 arranged therein, at least one door 16 for egress in and out of cabin 12, a control area 18 having one or more seats 20 for one or more train operators and windows 22 for viewing the progress of the train. It will be understood by those skilled in the art that the above depiction is for purposes of illustration only in that many other layouts are possible. For example, the airport shuttles at Denver International Airport have dispensed entirely with the operator portion 18 of the cabin 12, instead utilizing a fully automated system. Such variations are well-known in the art and will not be further discussed herein.

Figure 1B:
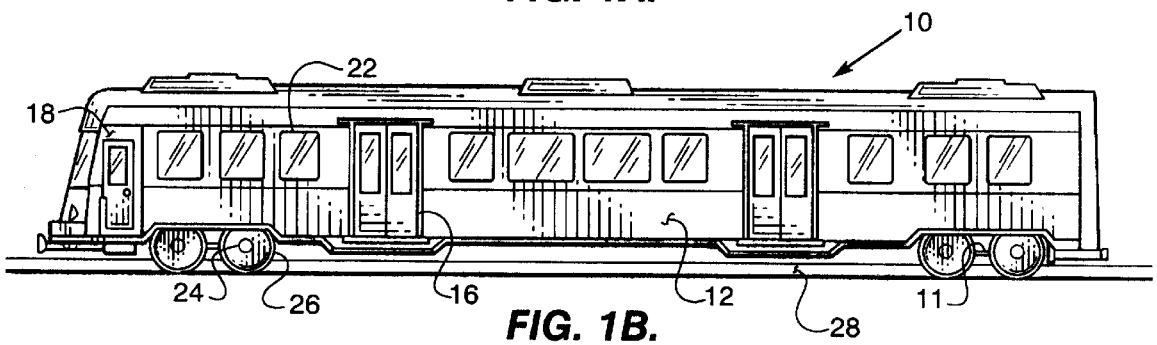
Figures 2A, 2B, 2C:
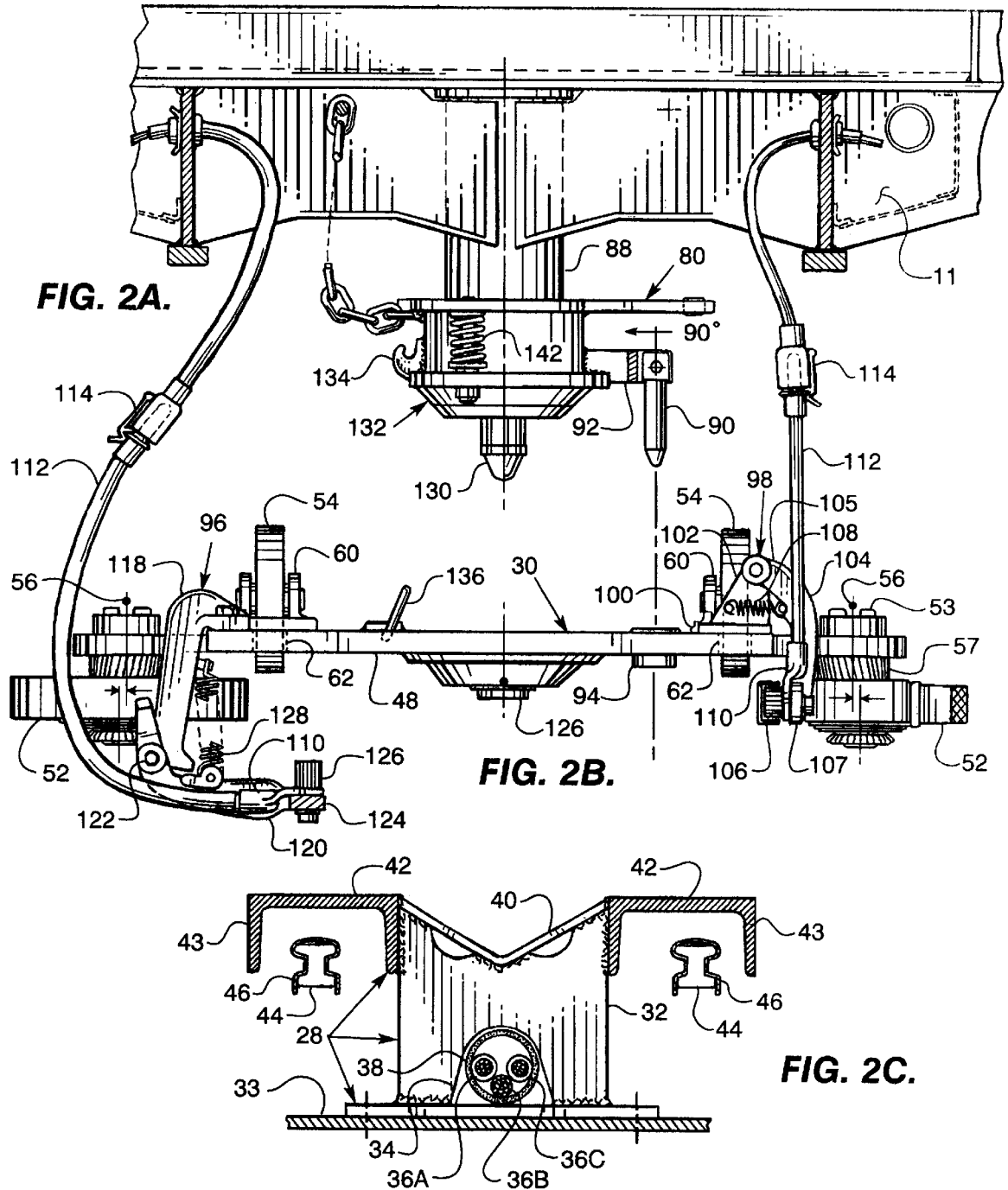
FIGS. 2A, 2B and 2C are exploded front views of the power collection apparatus employed in the embodiment of FIG. 1.

Mounted to an understructure 11 beneath vehicle 10 as shown in FIG. 2B is a trolley 30 to initiate steering actuation. Wheels 26 are mounted on short shafts 24 of a steerable hub 25. Wheels 26 are preferably arranged in two opposing pairs as illustrated in FIGS. 1B and 3. Wheels 26 are preferably of rubber which provide for a quiet and cushioned ride for the passengers. Trolley 30 as shown in FIG. 2B engages a T-shaped guide beam 28, shown in FIG. 2C, situated underneath cabin 12 as described below for guidance and for collecting electrical power. The combination of an independent trolley 30 of FIG. 2B and T-shaped guide beam 28 of FIG. 2C is the heart of this present invention.

Figure 4:
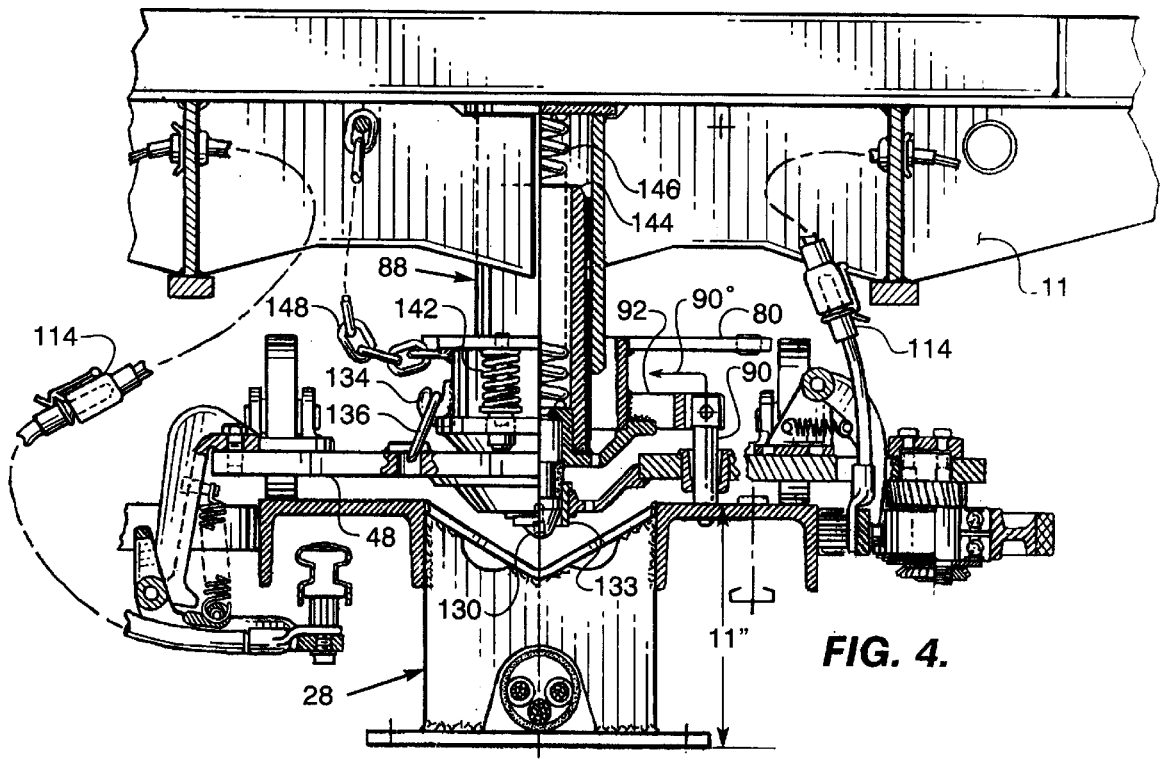
FIG. 4 is a partial underfloor cross sectional view of the trolley and its cooperating structures of FIG. 3 taken along line 4—4.

As shown in FIGS. 2C and 4, T-shaped guide beam 28 comprises a base plate 32 having a U-shaped cut-out 34 contained therein. Base 32 is rigidly mounted to a road bed 33. Cut-out 34 extends along the direction of travel of vehicle 10 and provides for one or more electrical cables 36A,B,C preferably contained within a steel conduit 38. FIG. 5 shows an alternate embodiment of guide beam 28 that uses a very large steel tube 37 as the structural backbone as well as a capacious conduit for power, lighting and signaling conductors and cables. In the illustrated embodiment, cables 36A, B and C carry 3 phase, 60 cycle 600 volts alternating current with 36B being neutral or grounded. A V-shaped trough 40 is provided atop base 32 for clearance of a male pivot 130 as described below. This feature is designed to reduce the vertical lifting force created by any side force at the guide roller contact.

Extending laterally from base 32 are opposing members 42, preferably standard structural channels, which are generally an inverted U-shape whose legs comprise flanges 43. Each member 42 is in electrical communication with grounding cable 36B. Suspended within and behind each flange 43 is a conductor 44 which has insulation 46 surrounding the top and sides thereof, leaving only the underside of same exposed. Conductors 44 are in electrical communication with cables 36A, B and C respectively. The combination of flanges 43 and insulation 46 is provided to minimize the possibility of accidental electrocution of humans and stray animals by leaving only the underside of conductor 44 exposed for electrical power contact.

As best seen in FIG. 2B, trolley assembly 30 includes certain guidance and steering elements comprising a generally rectangular plate 48 which independently extends across the top of T-shaped guide beam 28 of FIG. 2C. Mounted at the four corners 50 of plate 48 are four guide rollers 52 and four support rollers 54. Each guide roller 52 is mounted to a vertical axle 56 extending downwardly from plate 48. Each guide roller 52 rotatably engages flange 43 of U-shaped members 42. As best seen in FIG. 6, the four vertical axles 56 have a small eccentricity 55 with a tooth perimeter which engages a worm shaft 57 supported horizontally on plate 48. Cap screws 53, when loosened, allow a crank handle 59 to rotate shaft 56 to adjust wear clearance of roller 52 to flange 43.

Each support roller 54 is rotatably mounted between a pair of roller mount posts 60 extending upwardly from plate 48. Each support roller 54 rotates about a horizontal axle which extends parallel to the top surfaces 42 of the T-shaped guide beam 28. In this embodiment, each support roller 54 has a diameter which extends the periphery of same below plate 48 via a slot 62 to ride on the top surface 42 of guide beam 28.

As shown in FIG. 3 of the preferred embodiment, each wheel 26 is driven by an understructure 11 mounted gearmotor 64. Each motor 64 is connected to an inboard flexible U-joint 65 to a drive shaft 66 to an outboard flexible U-joint 68 which transmits power via a set of reduction gears (not shown) in hub 25. In the preferred embodiment, but not limited thereto, the two reduction gears have a total ratio of 20:1.

Steering of wheels 26 is provided by tie rods 70A and 70B which are connected to a center crank 72 pivotally mounted on the underframe 11. As shown, each center crank 72 is connected to two tie rods 70A and 70B which extend laterally to wheel steering arms 71 of wheel hubs 25 to provide complimentary steering to pairs of wheels 26 on opposing sides of T-shaped guide beam 28. Center crank 72 in turn is integral to a lever arm 74 via a pivot 76 mounted to understructure 11. Lever arm 74 is connected to a steering rod 78 which, in turn, is connected to one side of a steering arm 80. The other side of steering arm 80 has a second steering rod 82 connected thereto which provides steering for a second pair of similar wheels 26 (not shown) associated with trolley 30.

Those skilled in the art will recognize that the above describes one form of an automotive steering system and that variations of such a system are also applicable to the present invention. Such systems are well known in the art and will not be further described herein.

The angular orientation of steering arm 80 is stubbornly controlled by a pair of hydraulic cylinders 84 having shafts 85 connected to both sides of steering arm 80 proximate to steering shafts 78 and 82. Hydraulic cylinders 84 are powered by a pump 86. An entire steering arm structure 132 is pivotally mounted to a column 88 extending downwardly from understructure 11.

A sensor post 90 is mounted to a sensor yoke 92 extending from steering arm structure 132. Sensor post 90 extends downwardly through a corresponding annulus 94 on the centerline of plate 48 as best partially seen in FIG. 4. When vehicle 10 approaches a curve, trolley 30 conforms and turns in a directional deviation which causes sensor post 90 to laterally activate microswitch probes 91A or 91B. The movement of sensor post 90 provides an electrical directive to pump 86 to activate cylinders 84 in a predetermined manner to move wheel hubs 25 to accommodate the curvature.

In the preferred embodiment, post 90 and annulus 94 are duplicated fore and aft of the swiveling column 88. Additional microswitches (not shown) provide a more sophisticated precise steering command.

Rotation of trolley 30 activates diagonal microswitches to trigger a hydraulic assist for a curve. A side force (i.e. a wind storm) activates parallel microswitches to trigger a slight steering bias to offset the side force only.

Electric power is provided to vehicle 10 via each trolley 30 using four high voltage conductor contact assemblies 96 in combination with two ground contact assemblies 98. Ground contact assemblies 96 are mounted on small base plates 100 best seen in FIGS. 2B, 3 and 4. A triangular frame 102 extends upwardly therefrom and a grounding arm 104 is pivotally mounted on a first end 105 thereof to the top of post 102. Grounding arm 104 extends downwardly and outwardly to position a second end 107 thereof to a position proximate to flange 43.

A sliding contact shoe 106 is mounted to second end 107 and extends towards and contacts guide beam flange 43. To maintain a firm contact, a pair of springs 108 extends between post 102 and arm 104 at a point approximately midway between first end 105 and second end 107 and resiliently urges arm 104 inward to bias sliding contact shoe 106 in contact with flange 43.

An electrical connector 110 is mounted to and provides an electrical connection between sliding contact 106 and electrical transmission cable 112. Electrical transmission cable 112 is preferably provided with a quick disconnect 114 to allow easy separation of trolley 30 from vehicle 10 as needed for periodic, scheduled service.

Conductor contact assemblies 96 are mounted on trolley plate 48 also best seen in FIGS. 3 and 4. An arm post 118 extends outwardly and then downwardly to a position below flange 43. An insulating, polycarbonate (LEXAN or better) conductor contact arm 120 is pivotally mounted on a first end 122 thereof at the bottom of post 118. Contact arm 120 extends inwardly to position a second end 124 thereof in alignment directly underneath conductor 44. An electrical sliding contact shoe 126 is mounted to a second end 124 and extends upwardly to press conductor 44. To maintain a firm contact, two bias springs 128 extend between post 118 and arm 120 at a point approximately midway between first end 118 and second end 124 and resiliently urge arm 120 upward to bias sliding contact shoe 126 to engage with conductor 44.

An electrical connector 110 is mounted to and provides an electrical connection between sliding contact 126 and electrical transmission cable 112. Electrical transmission cable 112 is preferably provided with a quick disconnect 114 to allow easy separation of trolley 30 from vehicle 10 as needed for scheduled service.

FIGS. 2 and 4 demonstrate how the understructure 11, trolley 30 and guide beam 28 are mated together. It will be understood by those skilled in the art that the weight of vehicle 10 and its understructure 11 are totally supported by wheels 26.

Steering arm structure 132 provides male pivot 130 which mates with a corresponding female annulus 133. In the preferred embodiment, male pivot 130 is spherical in its radial fit and female annulus 133 is cylindrical. This allows any minor angularity without backlash. In this embodiment, male pivot 130 and female annulus 133 are positioned within trough area 40.

A pair of hooks 134 mounted on steering arm structure 132 engages a corresponding pair of chain links 136 mounted in top surface of trolley plate 48 to secure trolley 30 to rotatable steering arm structure 132.

It will be noted by those skilled in the art that this arrangement allows for easy maintenance of trolley 30 in that simply jacking up trolley 30 compressing four springs 142 to disengage the two loop chains 136 from hooks 134 and releasing power connectors 114 separates trolley 30 from vehicle 10. Those skilled in the art will recognize that other configurations are possible.

As best seen in FIGS. 2 and 4, steering arm structure 132 is rotatable, and vertically sliding within hollow, cylindrical fixed column 88 which receives a corresponding telescoping portion 144 being a vertical cylindrical extension of rotatable steering arm structure 132. As best seen in FIG. 4, telescoping portion 144 and post 88 are biased to separation by a spring 146 contained therein. To prevent complete separation, two limit chains 148 are provided, which, in normal operation, are in a slack position.

Steering arm structure 132 is pivotally mounted within post 88 to allow rotation about a vertical axis thereof. Spring 146 is provided to maintain a positive downward engagement of trolley 30 on guide beam 28, regardless of road shocks.

Although only certain embodiments have been illustrated and described, it will be apparent to those skilled in the art that various changes and modifications may be made therein without departing from the spirit of the invention or from the scope of the appended claims.

What is claimed is:

1. A steering system for a vehicle on a public transit system, the steering system comprising in combination:

a road bed having a guide beam mounted thereon, one or more replaceable, free-floating, independent trolleys, the one or more trolleys being positioned slidably and vertically between the vehicle and the guide beam and each of the one or more trolleys having four precisely adjustable guide rollers, the guide beam having side flange means for providing guidance to the one or more trolleys for accurate steering of the vehicle; and two sensor posts and two annuluses extending through the one or more trolleys, each of the two sensor posts having an electronic sensor probe mounted thereon for detecting relative movement of the one or more trolleys with respect to the guide beam, the movement activating means for steering the vehicle.

2. The steering system of claim 1 wherein the guide beam supports one or more insulated power conductors and each of the trolleys supports a plurality of electrical contacts engaging the one or more insulated power conductors, the plurality of electrical contacts in electrical communication with the vehicle.

3. The system of claim 2 wherein the insulated power conductors are mounted within channels, the channels being an inverted, rectangular U-shaped extending laterally from a tubular support structure.

4. The system of claim 3 wherein the one or more power conductors are insulatedly suspended within the channels, the one or more conductors having continuous insulation on the top and sides thereof.

5. The system of claim 3 further comprising at least one contactor assembly comprising an arm post having a rigid arm extending outwardly and downwardly beside at least one of the channels and an insulated contact arm pivotally mounted to the arm post, the contact arm extending inwardly and upwardly to contact the underside of the conductor, the contactor assembly further comprising a sliding shoe mounted on the contact arm in electrical contact with the conductor, the articulated arm being biased to engage the shoe with the conductor, the sliding contact being in electrical communication with the vehicle.

6. The steering system of claim 2 wherein each trolley further comprises an independent interchangeable steering trolley plate having the plurality of electrical contacts being spring urged for securing electrical power from the at least one insulated power conductors, the guide beam further having guide flanges extending laterally therefrom, at least one insulated power conductors being mounted underneath the guide flanges thereby preventing accidental contact therewith.

7. The steering system of claim 2 wherein means for quick disconnection and connection is provided between the plurality of electrical contacts and the vehicle.

8. The steering system of claim 7 whereby the quick disconnect and connect means comprises a pair of spring loaded securing springs maintaining two chains in firm contact with two hooks whereby quick disconnection and connection is provided by compressing said securing springs to release said chains from said hooks.

9. The steering system of claim 1 wherein the guide beam has a double planar top surface separated by a V-shaped depression to clear the two sensor posts.

10. A steering system for a vehicle on a public transit system, the steering system comprising in combination:

a guide beam, one or more replaceable, independent trolleys, the one or more trolleys being positioned between the vehicle and the guide beam and the one or more trolleys each having four precisely adjustable guide rollers, the guide beam having means for providing guidance to the one or more trolleys for accurate steering of the vehicle, the means for providing guidance to the vehicle comprising a plate extending across the guide beam, a plurality of side rollers and a plurality of top rollers being mounted to the plate, the plate having a steering arm structure pivotally mounted above said plate, at least one steering rod being mounted at one end thereof to the steering arm structure, the at least one steering rod corresponding to a pair of opposing wheel hubs mounted to the vehicle, the other end of the steering rods being mounted to a lever arm pivotally mounted on an understructure of the vehicle, the lever arm being integral to a center crank, the center crank having two lateral tie rods attached thereto, each tie rod being associated with one of each opposing pair of wheel hubs, the tie rods providing steering direction to wheels corresponding to the angular deviation of the trolley.

11. The device of claim 10 wherein the angular orientation of the steering arm is controlled by at least one hydraulic cylinder having a shaft connected to the steering arm.

12. The device of claim 11 wherein a steering arm sensor post and an annulus extending through the trolley, the sensor post having sensor probes mounted thereon for detecting relative movement of the trolley with respect to the guide beam, the movement activating the hydraulic cylinders to steer the wheels.

* * * * *